US012794085B2

(12) United States Patent
Tan et al.

(10) Patent No.: US 12,794,085 B2
(45) Date of Patent: Nov. 10, 2026

(54) BATTERY PACK AND VEHICLE

(71) Applicant: BYD COMPANY LIMITED, Shenzhen (CN)

(72) Inventors: Liangwen Tan, Shenzhen (CN); Jing Tan, Shenzhen (CN); Wenhui Chen, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 746 days.

(21) Appl. No.: 17/923,419

(22) PCT Filed: Mar. 26, 2021

(86) PCT No.: PCT/CN2021/083300
§ 371 (c)(1),
(2) Date: Nov. 4, 2022

(87) PCT Pub. No.: WO2021/238379
PCT Pub. Date: Dec. 2, 2021

(65) Prior Publication Data
US 2023/0198102 A1 Jun. 22, 2023

(30) Foreign Application Priority Data
May 27, 2020 (CN) ........................ 202010462922.X

(51) Int. Cl.
*H01M 50/507* (2021.01)
*B60L 50/64* (2019.01)
(Continued)

(52) U.S. Cl.
CPC ........... *H01M 50/507* (2021.01); *B60L 50/64* (2019.02); *B60L 58/26* (2019.02); *H01M 10/613* (2015.04); *H01M 10/6556* (2015.04); *H01M 10/6561* (2015.04); *H01M 50/209* (2021.01); *H01M 50/271* (2021.01)

(58) Field of Classification Search
CPC .. H01M 50/51; H01M 50/507; H01M 50/204; H01M 50/209; H01M 50/233; H01M 50/242; H01M 50/271
See application file for complete search history.

(56) References Cited

U.S. PATENT DOCUMENTS 8,642,206 B2 * 2/2014 Kim .................... H01M 10/658
429/138
2018/0366711 A1 * 12/2018 Igarashi .............. H01M 50/559
(Continued)

FOREIGN PATENT DOCUMENTS

CN 202268412 U 6/2012
CN 102623739 A 8/2012
(Continued)

OTHER PUBLICATIONS

International Search Report and Written Opinion for Application No. PCT/CN2021/083300, mailed on Jun. 30, 2021, 9 pages.

*Primary Examiner* — Barbara L Gilliam
(74) *Attorney, Agent, or Firm* — Sheppard Mullin Richter & Hampton LLP

(57) ABSTRACT

A battery pack includes a tray including an accommodating groove, where a side wall of the accommodating groove comprises at least one through hole. At least one battery array is arranged in the accommodating groove and includes multiple batteries. Each of the multiple batteries includes an electrode terminal at a first side of the battery facing the at least one through hole. At least one electrical connector is provided in the accommodating groove and is connected to electrode terminals of at least two batteries of the multiple batteries. The at least one through hole exposes the electrode terminals and the at least one electrical connector.

20 Claims, 4 Drawing Sheets

(51) Int. Cl.

| | |
|---|---|
| ***B60L 58/26*** | (2019.01) |
| ***H01M 10/613*** | (2014.01) |
| ***H01M 10/6556*** | (2014.01) |
| ***H01M 10/6561*** | (2014.01) |
| ***H01M 50/209*** | (2021.01) |
| ***H01M 50/271*** | (2021.01) |

(56) References Cited

U.S. PATENT DOCUMENTS

| | | | | |
|---|---|---|---|---|
| 2019/0334136 | A1 | 10/2019 | Eftekhari et al. | |
| 2021/0159567 | A1* | 5/2021 | Pires | H01M 50/242 |
| 2023/0112735 | A1* | 4/2023 | Tan | H01M 10/613 180/68.5 |

FOREIGN PATENT DOCUMENTS

| | | | |
|---|---|---|---|
| CN | 202434615 | U | 9/2012 |
| CN | 207368169 | U | 5/2018 |
| CN | 207459028 | U | 6/2018 |
| CN | 207967238 | U | 10/2018 |
| CN | 110165118 | A | 8/2019 |
| CN | 110190216 | A | 8/2019 |
| CN | 209217036 | U | 8/2019 |
| CN | 209374503 | U | 9/2019 |
| CN | 209993659 | U | 1/2020 |
| CN | 210245592 | U | 4/2020 |
| JP | 2011-204394 | A | 10/2011 |
| JP | 2019-075256 | A | 5/2019 |
| KR | 101359905 | B1 | 2/2014 |
| WO | 2012102496 | A3 | 10/2012 |

* cited by examiner

BATTERY PACK AND VEHICLE

CROSS-REFERENCE TO RELATED APPLICATIONS

This application is a National Phase Application of International Patent Application No. PCT/CN2021/083300 filed with the China National Intellectual Property Administration (CNIPA) on Mar. 26, 2021, which is based on and claims priority to and benefits of Chinese Patent Application No. 202010462922.X, filed on May 27, 2020 and entitled "BATTERY PACK AND VEHICLE". The entire content of all of the above-identified applications is incorporated herein by reference.

FIELD

The present disclosure relates to the technical field of batteries, and specifically to a battery pack and a vehicle.

BACKGROUND

With the development of science and technology and consumption of conventional energy, new energy vehicles gradually become popular in people's lives due to their high environmental friendliness. As a most important segment in the development of new energy vehicle technology, the battery pack technology influences the development and future of new energy vehicles.

In the related art, the battery pack for new energy vehicles is assembled by arranging several batteries in sequence to form a battery array, then welding the electrode terminals of the batteries to an electrical connector to enable electrical connections between batteries, and then positioning the welded battery array in a tray. However, the welded battery array as a whole is difficult to be mounted in the tray, and problems such as falling off of the welded portion between the electrode terminals and the electrical connector and damage to the electrical connector are likely to occur in the process of transferring the battery array into the tray, thereby increasing the production cost and influencing the production and use of the battery pack.

SUMMARY

The present disclosure at least solves one of the technical problems in the related art. The present disclosure provides a battery pack, which can simplify the connection process of an electrode terminal of a battery to an electrical connector, thereby optimizing the process flow.

The present disclosure further provides a vehicle.

The battery pack according to the present disclosure includes a tray, provided with an accommodating groove thereon, where at least one through hole is provided on a side wall of the accommodating groove; at least one battery array, arranged in the accommodating groove, and each including multiple batteries arranged in sequence, where each of the batteries includes an electrode terminal at the side facing the through hole; at least one electrical connector, provided in the accommodating groove and connected to the electrode terminals of at least two batteries, where the through hole allows the electrode terminals and the electrical connector to be exposed.

Therefore, in the battery pack according to the present disclosure, the electrode terminals of the batteries and the electrical connector in the accommodating groove can be connected via the through hole. This eliminates the need of performing the connection procedure of the electrode terminals of the batteries to the electrical connector outside the tray, thereby simplifying the assembly process of the battery pack, and optimizing the process flow.

In an embodiment of the present disclosure, the tray includes a bottom plate and side beams peripherally arranged around the bottom plate, where the bottom plate and the side beams jointly define the accommodating groove. The side beams include a first side beam and a second side beam which are oppositely arranged along a first direction. At least one of the first side beam and the second side beam is provided with the through hole, and the first direction is a length direction of the battery pack or a width direction of the battery pack.

In an embodiment of the present disclosure, at least two sets of battery arrays are included. At least one partition beam extending along the first direction is provided on the bottom plate, and the at least one partition beam divides the accommodating groove into multiple sub-grooves, where at least one set of battery array is arranged in the sub-groove.

In an embodiment of the present disclosure, the at least one electrical connector includes at least one first electrical connector and at least one second electrical connector. The electrode terminals of two adjacent batteries in a same set of battery array are connected through the first electrical connector, and the electrode terminals of two adjacent batteries located at two sides of the partition beam are connected through at least one second electrical connector.

In an embodiment of the present disclosure, the first electrical connector and the second electrical connector are both a connection sheet. Length directions of the first electrical connector and the second electrical connector are inclined relative to the bottom plate. The length of the second electrical connector is greater than the length of the first electrical connector. The inclination angle of the second electrical connector relative to the bottom plate is smaller than the inclination angle of the first electrical connector relative to the bottom plate.

In an embodiment of the present disclosure, the multiple batteries in the battery array are arranged in sequence along a second direction, where the length of the battery extends along the first direction, the electrode terminal of the battery is arranged on one side of the battery along the first direction, and the thickness of the battery extends along the second direction. The first direction is the length direction of the battery pack, and the second direction is the width direction of the battery pack. Alternatively, the first direction is the width direction of the battery pack, and the second direction is the length direction of the battery pack.

In an embodiment of the present disclosure, one through hole is provided, which corresponds to the electrode terminals of batteries in all the battery arrays.

In an embodiment of the present disclosure, the battery pack also includes a power distribution box electrically connected to the battery array. The power distribution box is arranged in the accommodating groove between the battery array and the side beam provided with the through hole, to maintain the power distribution box through the through hole.

In an embodiment of the present disclosure, the battery pack also includes an upper cover, which is covered on the top of the tray, and internally provided with a flow channel.

In an embodiment of the present disclosure, the upper cover is a direct cooling plate and includes: a first heat dissipation plate and a second heat dissipation plate that jointly define the flow channel.

In an embodiment of the present disclosure, the battery pack further includes a sealing cover that seals the at least one through hole, and is detachably connected to the tray.

The vehicle according to the present disclosure includes the battery pack.

A portion of additional aspects and advantages of the present disclosure are provided in the following description, and become apparent in the following description or understood through the practice of the present disclosure.

BRIEF DESCRIPTION OF THE DRAWINGS

These and other aspects and advantages of embodiments of the present disclosure will become apparent and more readily appreciated from the following descriptions made with reference to the drawings.

Figure 1:
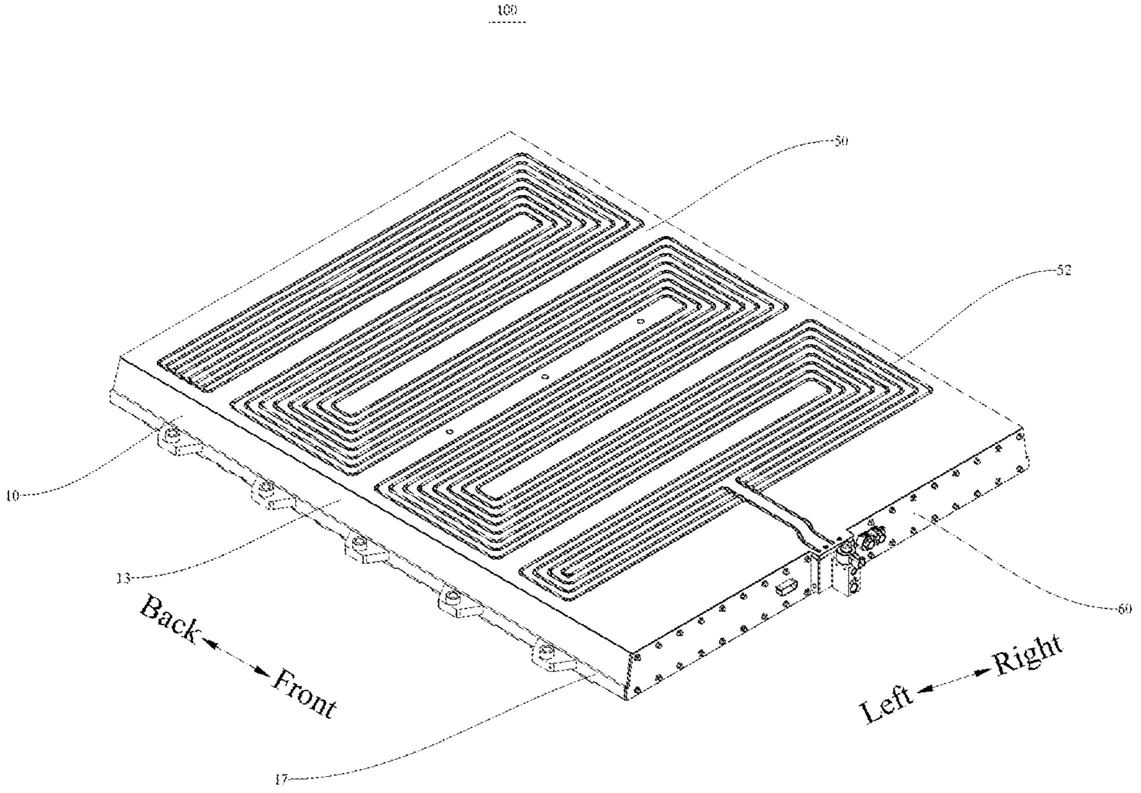
FIG. 1 is a schematic view of a battery pack.

REFERENCE NUMERALS battery pack 100;
tray 10; accommodating groove 11; through hole 12; side beam 13; upper side beam 15; lower side beam 16; bottom plate 17; partition beam 18;
battery array 20; battery 21; electrode terminal 22;
electrical connector 30; first electrical connector 31; second electrical connector 32;
power distribution box 40;
upper cover 50; second heat dissipation plate 51; first heat dissipation plate 52; sealing gasket 53; and
sealing cover 60.

DETAILED DESCRIPTION

The embodiments of the present disclosure are described in detail below, and the embodiments described with reference to accompanying drawings are exemplary. Detail description of the embodiments of the present disclosure will be made in the following.

A battery pack 100 according to an embodiment of the present disclosure is described below with reference to FIGS. 1 to 5. The battery pack 100 is applicable to vehicles.

Figure 2:
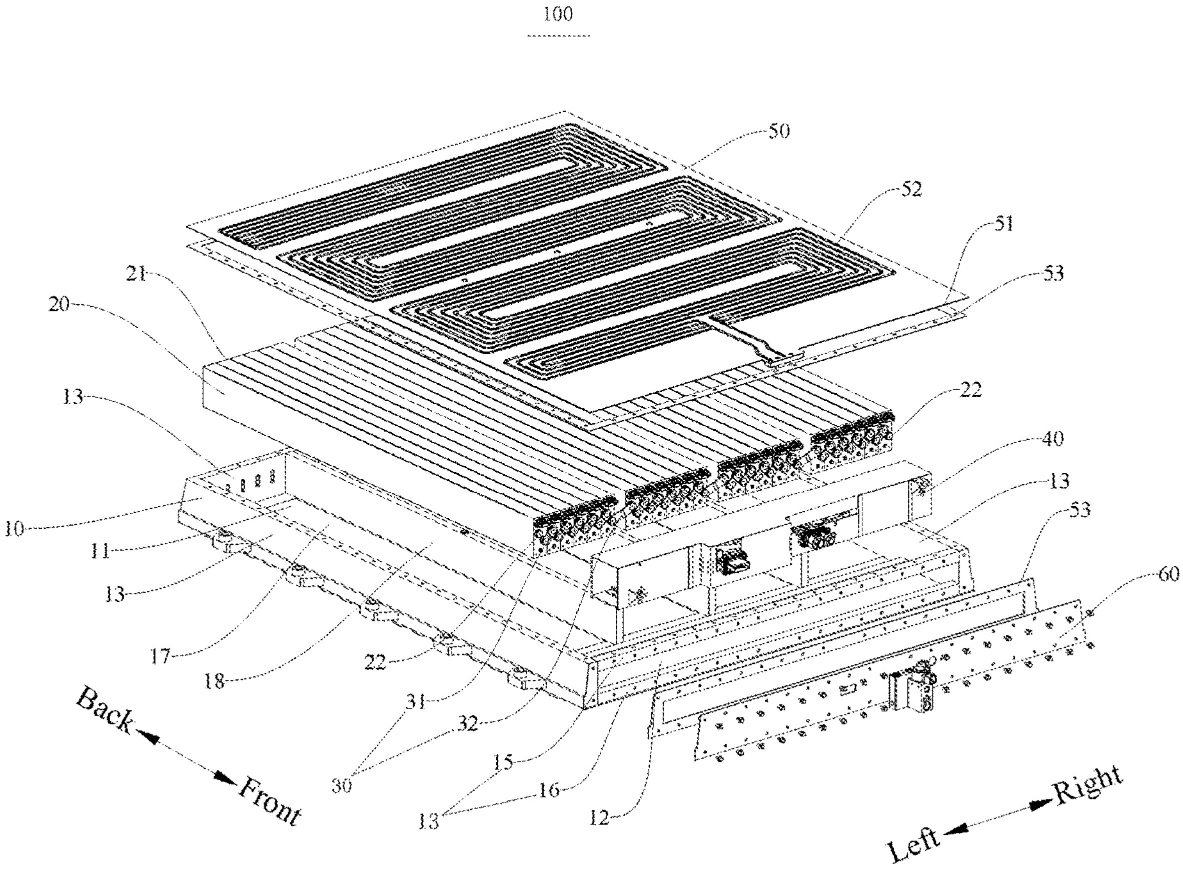
FIG. 2 is an exploded view of a battery pack.

As shown in FIGS. 1 and 2, the battery pack 100 according to an embodiment of the present disclosure may include: a tray 10, at least one battery array 20 and at least one electrical connector 30. An accommodating groove 11 is provided on the tray 10, and the accommodating groove 11 is configured to accommodate the battery array 20. Namely, the battery array 20 is mounted in the accommodating groove 11 of the tray 10, and each of the at least one battery array 20 mainly includes multiple batteries 21. The battery array 20 including the multiple batteries 21 is arranged in the accommodating groove 11, and the accommodating groove 11 can provide enough space to install the battery array 20, so that the battery array 20 can supply energy for the battery pack 100 stably without external interference, thereby improving the stability of the battery pack 100.

As shown in FIGS. 1 to 5, at least one through hole 12 is provided on a side wall of the accommodating groove 11; and the battery 21 in the battery array 20 arranged in the accommodating groove 11 is provided with an electrode terminal 22 at a side close to the through hole 12. As shown in FIGS. 1 to 5, the at least one electrical connector 30 is arranged in the accommodating groove 11, and the at least one electrical connector 30 is connected to the electrode terminals 22 of at least two batteries. The through hole 12 allows the electrode terminals 22 and the electrical connector 30 to be exposed. Namely, the at least one electrical connector 30 is mounted in the accommodating groove 11, and the at least one electrical connector 30 is connected between the electrode terminals 22 of at least two batteries 21. The electrode terminals 22 of at least two batteries 21 in the battery array 20 are connected through the at least one electrical connector 30, so that at least two batteries 21 are connected to each other, to generate the energy of the battery pack 100 together. Such an arrangement can ensure the sequential connection of multiple batteries 21 in the battery array 20. For example, the electrical connector 30 can connect two adjacent or spaced batteries 21 in series or connect two adjacent or spaced batteries 21 in parallel, or connect three or more batteries 21 in parallel.

Figure 4:
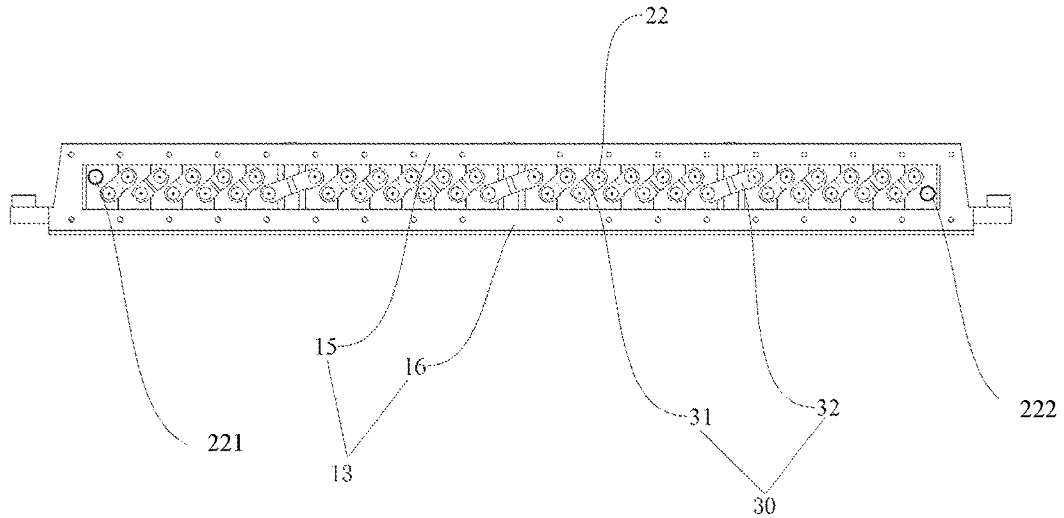
FIG. 4 is a side view of a battery pack.

As shown in FIG. 4, the through hole 12 provides a mounting space for the electrical connector 30 connecting the electrode terminals 22 of two batteries 21. When the electrical connector 30 is mounted, the electrical connector 30 is connected to the electrode terminals 22 of the batteries 21 via the through hole 12. This eliminates the need of performing the connection procedure of the electrode terminals 22 of the battery array 20 to the electrical connector 30 outside the tray 10, thereby reducing the difficulty in the manufacturing of the battery pack 100, optimizing the process design, avoiding the wear of the electrical connector 30, and thus extending the life of the battery pack 100.

As shown in FIGS. 1, 2, 3 and 5, the tray 10 includes a bottom plate 17 and side beams 13 peripherally arranged around the bottom plate 17. The bottom plate 17 and the side beams 13 jointly define the accommodating groove 11. The side beams 13 include a first side beam and a second side beam which are oppositely arranged along a first direction. The first direction is a length direction of the battery pack 100 or a width direction of the battery pack 100. Namely, the tray 10 may mainly include multiple side beams 13, and the multiple side beams 13 are connected and fixed to each other in sequence. Since the multiple side beams 13 are elevated beams higher than the bottom plate 17, the multiple side beams 13 connected to each other in sequence, together with the bottom plate 17, define the mounting space of the battery array 20, so as to ensure the mounting reliability of the battery array 20. The length direction of the battery pack 100 is a front-back direction as shown in FIG. 1, and the width direction of the battery pack 100 is a left-right direction as shown in FIG. 1.

It can be understood that the multiple side beams 13 are all made of materials with good heat dissipation performance and high strength. Because the battery array 20 may generate a lot of heat during operations, and side beams 13 with good heat dissipation performance can reduce the temperature of the battery array 20 to a certain extent, thereby ensuring the normal operation of the battery array 20, and avoiding the occurrence of accidents. Moreover, the side beams 13 with high strength can protect the battery array 20, to prevent the damage of the battery array 20 caused when the battery pack 100 is collided and squeezed, causing accidents, so as to extend the life of the battery pack 100. The side beams 13 may further have good flame retardancy, so that when the battery array 20 is overheated and undergoes spontaneous combustion due to an abnormal operation, the side beams 13 can prevent the battery array 20 from further combustion, thereby improving the safety of the battery pack 100.

It can be understood that when traveling with the vehicle on the road, the battery pack 100 is most likely to receive the collision from a direction vertical to the vehicle's driving direction, that is, the left and right sides of the battery pack 100. Therefore, at least one of the first side beam and the second side beam is designed with the through hole 12, so that the mounting and connection position of the electrode terminal 22 of the battery 21 in the battery array 20 to the electrical connector 30 is located in the driving direction of the vehicle. Such an arrangement can reduce the risk of accidents of the battery array 20 when the vehicle is collided, thereby improving the safety and reliability of the vehicle and the battery pack 100.

It should be noted that when the electrode terminals 22 of the battery 21 are arranged on both sides in the length direction of the battery 21, the first side beam and the second side beam are both provided with through holes 12.

As shown in FIGS. 1, 2, 3 and 5, the side beam 13 provided with the through hole 12 includes an upper side beam 15 and a lower side beam 16. The upper side beam 15 and the lower side beam 16 are spaced apart vertically, and the upper side beam 15 and the lower side beam 16 are connected between two side beams 13, and the through hole 12 is located between the upper side beam 15 and the lower side beam 16. Namely, the side beam 13, such as one of the first side beam and the second side beam, is designed with the through hole 12 and includes the upper side beam 15 and the lower side beam 16 located below the upper side beam 15. The upper side beam 15 is connected to two adjacent side beams 13, the lower side beam 16 is also connected to the two adjacent side beams 13, and there is a distance between the upper side beam 15 and the lower side beam 16. The position of the through hole 12 can be defined by the spaced arrangement of the upper side beam 15 and the lower side beam 16 to optimize the process and the structure. Moreover, the arrangement of the upper side beam 15 and the lower side beam 16 ensures the structural reliability of the tray 10.

As shown in FIGS. 1, 2, 3 and 5, at least two sets battery arrays 20 are provided. If multiple sets of battery arrays 20 are designed, when a battery 21 is damaged and needs to be repaired and replaced, only the damaged set is repaired and replaced. This avoids the waste caused by the maintenance and replacement of the multiple sets of battery arrays 20 on a whole, to save the cost of maintenance and replacement. Moreover, the use of multiple sets of battery arrays 20 can increase the contact area between the battery arrays 20 and the ambient air, to effectively improve the heat dissipation effect of the battery pack 100, and thus improve the safety performance of the battery pack 100.

Figure 5:
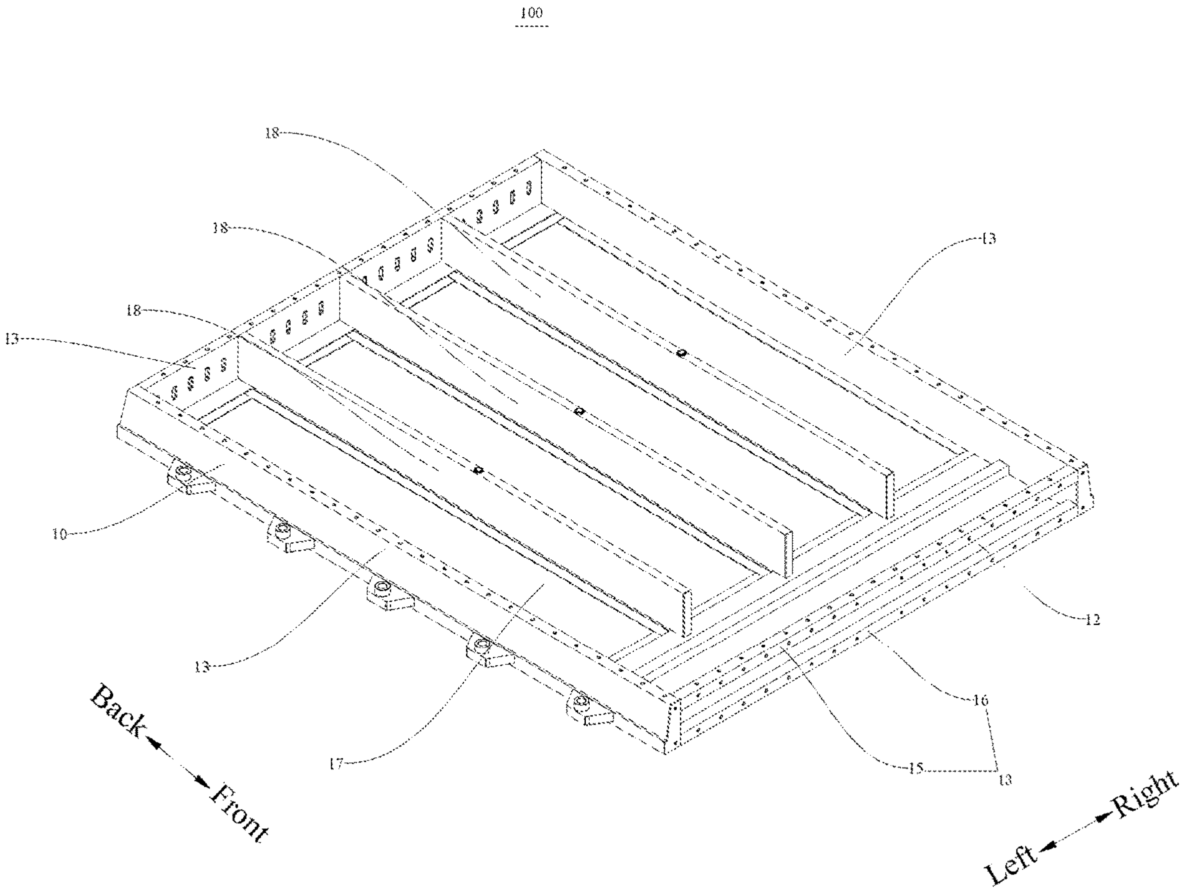
FIG. 5 is a schematic view of a tray.

As shown in FIG. 5, the bottom plate 17 is provided with at least one partition beam 18 extending along the first direction, and the at least one partition beam 18 divides the accommodating groove 11 into multiple sub-grooves, where at least one set of battery array 20 is arranged in the sub-groove. Specifically, the tray 10 may further include the at least one partition beam 18, and the bottom plate 17 is mounted below the accommodating groove 11 defined by the multiple side beams 13 connected in sequence. The number of battery arrays 20 in each sub-groove can be the same, or different. In addition, the bottom plate 17 has good flame retardancy and heat dissipation performance, to effectively reduce the temperature of the battery array 20 during operations and prevent the burning of the battery pack 100 caused by a high temperature, thereby extending the life of the battery pack 100 and avoiding the occurrence of accidents.

In an embodiment, the at least one partition beam 18 is mounted on the bottom plate 17, and the at least one partition beam 18 extends on the bottom plate 17 along the first direction. The partition beam 18 can space adjacent battery arrays 20 apart, to avoid the mutual influence of adjacent battery arrays 20. The partition beam 18 also has good flame retardancy. In such an arrangement, when one set of battery array 20 burns due to a high temperature, the partition beam 18 can prevent the fire from spreading to another set of battery array 20, to control the fire to the greatest extent, thereby improving the safety performance of the battery pack 100 and avoiding the occurrence of accidents.

In an embodiment, the partition beam 18 has good heat dissipation performance. Since multiple sets of battery arrays 20 are spaced apart by the at least one partition beam 18, the contact area between the battery array 20 and the at least one partition beam 18 is increased while the energy of the battery pack 100 is ensured by the multiple sets of battery arrays 20. The good heat dissipation performance of the partition beam 18 can effectively reduce the temperature of the battery array 20, increase the safety performance of the battery pack 100, avoid the occurrence of safety accidents. In addition, because the partition beam 18 is arranged between two adjacent battery arrays 20, the number of the partition beams 18 is one less than the number of the battery arrays 20. The at least one partition beam 18 is evenly distributed on the bottom plate 17, to divide the accommodating groove 11 evenly into multiple spaces of the same size, where batteries in the battery array 20 mounted in each space are exactly the same in terms of the number and the volume. Each battery array 20 is allowed for even heat dissipation, to prevent accidents due to a local high temperature caused by the uneven heat dissipation.

As shown in FIG. 4, the at least one electrical connector 30 includes at least one first electrical connector 31 and at least one second electrical connector 32. The electrode terminals 22 of two adjacent batteries 21 in a same set of battery array 20 are connected by the first electrical connector 31, and the electrode terminals 22 of two adjacent batteries 21 located at two sides of the partition beam 18 are connected by the second electrical connector 32.

It can be understood that one battery 21 is provided with two electrode terminals 22 including a positive electrode terminal 221 and a negative electrode terminal 222. For example, in the two electrode terminals 22 provided on the battery 21, the upper one is the positive electrode terminal 221, and the lower one is the negative electrode terminal 222. When the first electrical connector 31 is connected to the electrode terminals 22 of two adjacent batteries in the same set of battery array 20, one end of the first electrical connector 31 is connected to the positive electrode terminal 221 of one of the batteries 21, and the other end is connected to the negative electrode terminal 222 of another one of the batteries 21, whereby the two adjacent batteries 21 are connected to each other. When the second electrical connector 32 is connected to the electrode terminals 22 of two adjacent batteries 21 located at two sides of the partition beam 18, one end of the second electrical connector 32 is connected to the positive electrode terminal 221 of one of the batteries 21, and the other end is connected to the negative electrode terminal 222 of the other battery 21, whereby the two adjacent batteries 21 are connected to each other. Therefore, the current follows into the positive electrode terminal 221 and out of the negative electrode terminal 222, to constantly output energy to the outside.

The first electrical connector 31 and the second electrical connector 32 are both a connection sheet, and length directions of the first electrical connector 31 and the second electrical connector 32 are inclined relative to the bottom plate 17. The length of the second electrical connector 32 is greater than the length of the first electrical connector 31, and the inclination angle of the second electrical connector 32 relative to the bottom plate 17 is smaller than the inclination angle of the first electrical connector 31 relative to the bottom plate 17. The distance in the vertical direction between two electrode terminals 22 connected by the second electrical connector 32 is the same as the distance in the vertical direction between two electrode terminals 22 connected by the first electrical connector 31. However, due to the presence of the partition beam 18, the distance in the horizontal direction between two electrode terminals 22 connected by the second electrical connector 32 is longer than the distance in the horizontal direction between two electrode terminals 22 connected by the first electrical connector 31. Therefore, it can be understood that according to the Pythagorean theorem, the straight-line distance between two electrode terminals 22 connected by the second electrical connector 32 is longer than the straight-line distance between two electrode terminals 22 connected by the first electrical connector 31. Namely, the second electrical connector 32 is longer than the first electrical connector 31.

It can be understood that when the electrical connector 30 is connected to two adjacent batteries 21, one end of the electrical connector 30 is connected to the upper positive electrode terminal 221 of one of the batteries 21, and the other end is connected to the lower negative electrode terminal 222 of another one of the batteries 21. Therefore, when the electrical connector 30 is connected to the electrode terminals 22 of two adjacent batteries 21, it is inclined relative to the bottom plate 17. According to the law of sine and cosine, the inclination angle of the second electrical connector 32 relative to the bottom plate 17 is smaller than the inclination angle of the first electrical connector 31 relative to the bottom plate 17. Namely, the angle formed by the second electrical connector 32 with respect to the bottom plate 17 is smaller than the angle formed by the first electrical connector 31 with respect to the bottom plate 17. Through such an arrangement, multiple batteries can be connected to each other without changing the structure of the battery array 20, thereby making the structure more ingenious and optimizing the process flow.

The multiple batteries 21 in the battery array 20 are arranged in sequence along the second direction. The battery 21 has a length extending along the first direction, and the electrode terminal 22 of the battery 21 is arranged on one side of the battery 21 in the first direction. The thickness of the battery 21 extends along the second direction. The first direction is the length direction of the battery pack 100, and the second direction is the width direction of the battery pack 100. Alternatively, the first direction is the width direction of the battery pack 100, and the second direction is the length direction of the battery pack 100. By properly designing the arrangement direction and thickness direction of the batteries 21, the battery 21 are arranged stably in the battery pack 100, and the internal space of battery pack 100 are utilized properly. By providing the electrode terminals 22 at one side of the battery 21, the electrode terminals 22 of multiple batteries 21 are arranged in sequence, which facilitates the connection by the electrical connector 30.

In an embodiment, as shown in FIGS. 1 to 5, one through hole 12 is provided, and the through hole 12 corresponds to the electrode terminals 22 of batteries in all the battery arrays 20. Namely, the electrode terminals 22 of batteries 21 in the multiple sets of battery array 20 are all arranged facing the through hole 12. In such an arrangement, multiple sets of battery arrays 20 can be mounted and arranged in the accommodating groove 11 of the tray 10 first, and then the electrical connectors 30 are connected to the electrode terminals 22 of all batteries by welding via the through hole 12. This eliminates the need of performing the connection procedure of the electrode terminals 22 of the battery array 20 to the electrical connector 30 outside the tray 10, thereby simplifying the assembly process of the battery pack 100, and optimizing the process flow. Moreover, such an arrangement can also facilitate the maintenance of the battery array 20 directly via the through hole 12, to avoid the maintenance of the battery array 20 after removal from the accommodating groove 11, thereby saving the cost and reducing the difficulty of maintenance.

Figure 3:
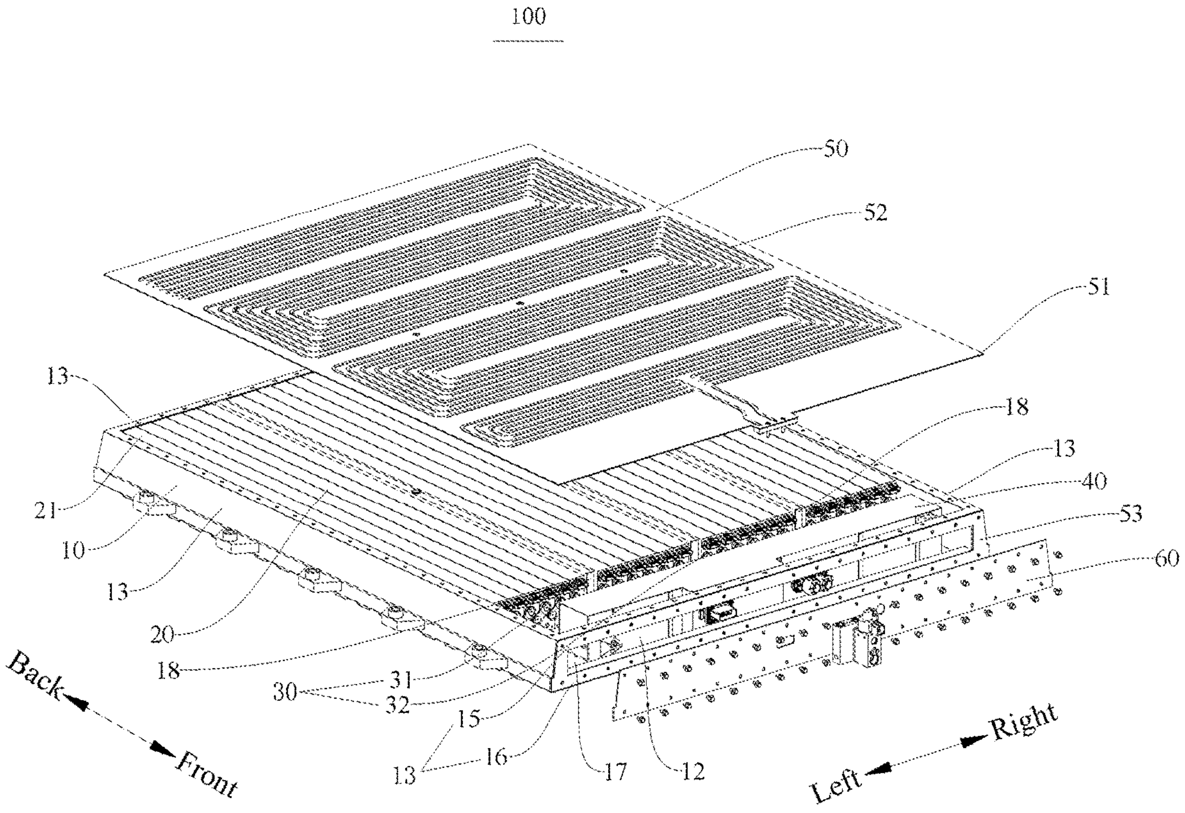
FIG. 3 is an exploded view of a battery pack.

As shown in FIGS. 2 and 3, the battery pack 100 further includes a power distribution box 40 electrically connected to the battery array 20. The power distribution box 40 is arranged in the accommodating groove 11, and the power distribution box 40 is located between the battery array 20 and the side beam 13 provided with the through hole 12, to maintain the power distribution box 40 via the through hole 12. Namely, after the battery array 20 is mounted and arranged in the tray 10, there is still space remained between the battery array 20 and the side beam 13 designed with the through hole 12 of the tray 10. The power distribution box 40 is mounted and arranged between the battery array 20 and the side beam 13 designed with the through hole 12 of the tray 10, in such a manner that the side of the power distribution box 40 close to the battery array 20 is connected to the battery array 20. The current generated by the battery array 20 is allowed to flow into the power distribution box 40, and is stably output to the outside from the side of the power distribution box 40 away from the battery array 20 by control, transform, distribution and other operations of the power distribution box 40. When the power distribution box 40 is damaged and needs to be repaired, the operation can also be performed via the through hole 12 directly, without taking out the power distribution box 40, to facilitate the maintenance and inspection of the power distribution box 40.

As shown in FIGS. 1, 2, 3 and 5, the battery pack 100 further includes an upper cover 50, which is covered on the top of the tray 10, and internally provided with a flow channel. Namely, the battery pack 100 further includes the upper cover 50. The upper cover 50 is mounted at the top the accommodating groove 11, and the upper cover 50, together with the bottom plate 17 and the multiple side beams 13, defines a closed accommodating groove 11, to prevent foreign objects from entering and damaging the battery array 20, and extend the life of the battery array 20. Definitely, in other embodiments, the upper cover 50 can also be integrated on the vehicle body.

In an embodiment, the upper cover 50 is internally designed with a flow channel, and the liquid in the flow channel flows to well dissipate the heat absorbed by the upper cover 50, thereby effectively reducing the temperature of the battery array 20 and improving the safety performance of the battery pack 100.

As shown in FIGS. 1, 2, and 3, the upper cover 50 is a direct cooling plate. The upper cover 50 includes a second heat dissipation plate 51 and a first heat dissipation plate 52, where the second heat dissipation plate 51 and the first heat dissipation plate 52 jointly define the flow channel. Specifically, the first heat dissipation plate 52 is formed with a convex flow channel, and the second heat dissipation plate 51 is arranged below the first heat dissipation plate 52 to seal the flow channel. Namely, the upper cover 50 is a direct cooling plate. The second heat dissipation plate 51 and the first heat dissipation plate 52 can both be aluminum plates. Since aluminum is not susceptible to oxidation and has a good heat dissipation performance, a low density, a low cost, and a high hardness, the second heat dissipation plate 51 is covered on the top of the accommodating groove 11 to seal the top of the accommodating groove 11. In this way, the weight of the battery pack 100 is reduced, and the upper cover 50 is ensured to have the good heat dissipation performance. In addition, the high strength of the heat dissipation plate 51 can protect the battery array 20 against damages when the battery pack 100 is collided and squeezed.

The first heat dissipation plate 52 is mounted and arranged above the second heat dissipation plate 51, and the first heat dissipation plate 52 is formed with a convex flow channel through a stamping process. The flow channel is tortuously arranged on the first heat dissipation plate 52. This arrangement can increase the length of the flow channel on the first heat dissipation plate 52 of the same area, to improve the heat dissipation of the upper cover 50 and reduce the temperature of the battery array 20 as much as possible. The first heat dissipation plate 52 and the second heat dissipation plate 51 are connected to each other by brazing, to achieve the sealing of the flow channel. The sealed flow channel is hollow and communicates with the exterior. A cooling channel is defined in the interior of the hollow flow channel, and a gaseous coolant is provided in the cooling channel. The gaseous coolant absorbing heat in the cooling channel can flow in the hollow flow channel, to reduce the temperature of the battery array 20. Therefore, in one embodiment, the heat dissipation effect of the upper cover 50 is improved.

In an embodiment, as shown in FIGS. 1 and 2, a seal gasket 53 or a sealant is provided between the edge of the upper cover 50 and the tray 10. The design of the seal gasket 53 or the sealant between the peripheral edge of the upper cover 50 and the tray 10 can increase the tightness of the upper cover 50 to the tray 10 and prevent foreign objects from entering and damaging the battery array 20 in one embodiment. In addition, the seal gasket 53 or the sealant can also reduce the wear caused by the direct contact of the metal upper cover 50 and the tray 10, thereby extending the life of the battery pack 100.

As shown in FIGS. 1 and 2, the battery pack 100 further includes: a sealing cover 60 for sealing the at least one through hole 12, where the sealing cover 60 is detachably connected to the tray 10. Namely, the sealing cover 60 is mounted on the side of the through hole 12 away from the battery array 20. The sealing cover 60 can be used to seal the through hole 12, to prevent foreign objects from entering via the through hole 12 and damaging the battery array 20, so as to extend the life of the battery pack 100. In addition, by detachably mounting and arranging the sealing cover 60 on the side of the through hole 12 away from the battery array 20, the sealing cover 60 can be conveniently removed to maintain the battery array 20 via the through hole 12, thereby saving the cost of maintenance, and optimizing the structure design.

In an embodiment, as shown in FIG. 2, a seal gasket 53 or a sealant is provided between the seal cover 60 and the tray 10. The design of the seal gasket 53 or the sealant between the seal cover 60 and the tray 10 can increase the tightness of the seal cover 60 to the tray 10 and prevent foreign matters from entering and damaging the battery array 20 in one embodiment. In addition, the seal gasket 53 or the sealant can also reduce the wear caused by the direct contact of the metal seal cover 60 and the tray 10, thereby extending the life of the battery pack 100.

A vehicle according to an embodiment of the present disclosure includes a battery pack 100 according to above embodiment. The battery pack 100 is mounted on a chassis of the vehicle. The battery pack 100 can supply to the vehicle the power needed for driving the vehicle on the road, make the vehicle more environmentally friendly and safe, and improve the user experience.

In the description of the present disclosure, it should be understood that, orientation or position relationships indicated by the terms such as “center”, “lateral”, “length”, “width”, “thickness”, “up”, “down”, “front”, “back”, “left”, “right”, “vertical”, “horizontal”, “top”, “bottom”, “inside”, “outside”, “axial”, and “radial” are based on orientation or position relationships shown in the accompanying drawings, and are used only for ease and brevity of illustration and description of the present disclosure, rather than indicating or implying that the mentioned apparatus or component must have a particular orientation or must be constructed and operated in a particular orientation. Therefore, such terms should not be construed as limiting of the present disclosure. In the descriptions of the present disclosure, “a plurality of” means two or more.

In the descriptions of this specification, descriptions using reference terms “an embodiment”, “some embodiments”, “an exemplary embodiment”, “an example”, “a specific example”, or “some examples” mean that specific characteristics, structures, materials, or features described with reference to the embodiment or example are included in at least one embodiment or example of the present disclosure. In this specification, schematic descriptions of the foregoing terms do not necessarily point at a same embodiment or example.

Although the embodiments of the present disclosure are already shown and described above, a person of ordinary skill in the art is to be understood that various changes, modifications, replacements, and variations may be made to the embodiments without departing from the principles and spirit of the present disclosure, and the scope of the present disclosure is defined by the appended claims and their equivalents.

What is claimed is:

1. A battery pack, comprising:

a tray comprising an accommodating groove, wherein a side wall of the accommodating groove comprises at least one through hole, and the tray comprises a bottom plate;

at least one battery array arranged in the accommodating groove and comprising multiple batteries, wherein each of the multiple batteries comprises an electrode terminal at a first side of the battery facing the at least one through hole; and at least one electrical connector provided in the accommodating groove and connected to electrode terminals of at least two batteries of the multiple batteries, wherein a length direction of the at least one electrical connector is inclined relative to the bottom plate, and the at least one through hole is configured to expose the electrode terminals and the at least one electrical connector and to allow connection of the electrode terminals and the at least one electrical connector while the at least one battery array remains arranged in the accommodating groove.

2. The battery pack according to claim 1, wherein the tray comprises side beams peripherally arranged around the bottom plate, the bottom plate and the side beams define the accommodating groove, and the side beams comprise a first side beam and a second side beam which are oppositely arranged along a first direction, at least one of the first side beam and the second side beam is provided with the at least one through hole, and the first direction is a length direction or a width direction of the battery pack.

3. The battery pack according to claim 2, further comprising at least two battery arrays including the at least one battery array, wherein the bottom plate comprises at least one partition beam extending along the first direction, the at least one partition beam divides the accommodating groove into multiple sub-grooves, and the at least two battery arrays are arranged in the multiple sub-grooves.

4. The battery pack according to claim 3, wherein the at least one electrical connector comprises a first electrical connector and a second electrical connector, electrode terminals of two adjacent batteries in a same battery array are connected through the first electrical connector, and the electrode terminals of two adjacent batteries located at two sides of the at least one partition beam are connected through the second electrical connector.

5. The battery pack according to claim 4, wherein the first electrical connector and the second electrical connector are connection sheets, a length direction of the first electrical connector and a length direction of the second electrical connector are inclined relative to the bottom plate, a length of the second electrical connector is greater than a length of the first electrical connector, and an inclination angle of the second electrical connector relative to the bottom plate is smaller than an inclination angle of the first electrical connector relative to the bottom plate.

6. The battery pack according to claim 2, wherein the multiple batteries in the at least one battery array are arranged along a second direction, a length of each of the multiple batteries extends along the first direction, the electrode terminal of the battery is arranged on the first side of the battery along the first direction, a thickness of the battery extends along the second direction, and the first direction is the length direction of the battery pack, and the second direction is the width direction of the battery pack, or the first direction is the width direction of the battery pack, and the second direction is the length direction of the battery pack.

7. The battery pack according to claim 1, wherein the at least one through hole comprises one through hole, and the one through hole corresponds to the electrode terminals of the multiple batteries in the at least one battery array.

8. The battery pack according to claim 1, further comprising a power distribution box electrically connected to the at least one battery array, wherein the power distribution box is arranged in the accommodating groove between the at least one battery array and a side beam having a through hole.

9. The battery pack according to claim 1, further comprising an upper cover, wherein the upper cover covers a top of the tray and has a flow channel.

10. The battery pack according to claim 9, wherein the upper cover is a cooling plate and comprises a first heat dissipation plate and a second heat dissipation plate that define the flow channel.

11. The battery pack according to claim 1, further comprising a sealing cover, wherein the sealing cover seals the at least one through hole and is connected to the tray.

12. A vehicle, comprising a battery pack, wherein the battery pack comprises:

a tray comprising an accommodating groove, wherein a side wall of the accommodating groove comprises at least one through hole, and the tray comprises a bottom plate;

at least one battery array arranged in the accommodating groove and comprising multiple batteries, wherein each of the multiple batteries comprises an electrode terminal at a first side of the battery facing the at least one through hole; and at least one electrical connector provided in the accommodating groove and connected to electrode terminals of at least two batteries of the multiple batteries, wherein a length direction of the at least one electrical connector is inclined relative to the bottom plate, and the at least one through hole is configured to expose the electrode terminals and the at least one electrical connector and to allow connection of the electrode terminals and the at least one electrical connector while the at least one battery array remains arranged in the accommodating groove.

13. The vehicle according to claim 12, wherein the tray comprises side beams peripherally arranged around the bottom plate, the bottom plate and the side beams define the accommodating groove, and the side beams comprise a first side beam and a second side beam which are oppositely arranged along a first direction, at least one of the first side beam and the second side beam is provided with the at least one through hole, and the first direction is a length direction or a width direction of the battery pack.

14. The vehicle according to claim 13, wherein the battery pack further comprises at least two battery arrays including the at least one battery array, wherein the bottom plate comprises at least one partition beam extending along the first direction, the at least one partition beam divides the accommodating groove into multiple sub-grooves, and the at least two battery arrays are arranged in the multiple sub-grooves.

15. The vehicle according to claim 14, wherein the at least one electrical connector comprises a first electrical connector and a second electrical connector, electrode terminals of two adjacent batteries in a same battery array are connected through the first electrical connector, and the electrode terminals of two adjacent batteries located at two sides of the at least one partition beam are connected through the second electrical connector.

16. The vehicle according to claim 15, wherein the first electrical connector and the second electrical connector are connection sheets, a length direction of the first electrical connector and a length direction of the second electrical connector are inclined relative to the bottom plate, a length of the second electrical connector is greater than a length of the first electrical connector, and an inclination angle of the second electrical connector relative to the bottom plate is smaller than an inclination angle of the first electrical connector relative to the bottom plate.

17. The vehicle according to claim 13, wherein the multiple batteries in the at least one battery array are arranged along a second direction, a length of each of the multiple batteries extends along the first direction, the electrode terminal of the battery is arranged on the first side of the battery along the first direction, a thickness of the battery extends along the second direction, and the first direction is the length direction of the battery pack, and the second direction is the width direction of the battery pack, or the first direction is the width direction of the battery pack, and the second direction is the length direction of the battery pack.

18. The vehicle according to claim 12, wherein the at least one through hole comprises one through hole, and the one through hole corresponds to the electrode terminals of the multiple batteries in the at least one battery array.

19. The vehicle according to claim 12, wherein the battery pack further comprises a power distribution box electrically connected to the at least one battery array, wherein the power distribution box is arranged in the accommodating groove between the at least one battery array and a side beam having a through hole.

20. The vehicle according to claim 12, wherein the battery pack further comprises an upper cover, wherein the upper cover covers a top of the tray and has a flow channel.

* * * * *